June 14, 1932.  A. J. WEATHERHEAD, JR  1,863,360

PIPE AND TUBE COUPLING

Filed June 13, 1930

INVENTOR
A. J. WEATHERHEAD JR.

BY

*Fisher, Moser + Moore*

ATTORNEY

Patented June 14, 1932

1,863,360

UNITED STATES PATENT OFFICE

ALBERT J. WEATHERHEAD, JR., OF CLEVELAND, OHIO

PIPE AND TUBE COUPLING

Application filed June 13, 1930. Serial No. 460,836.

My invention relates to pipe and tube couplings, and the main purpose of the invention is to provide a simple form of coupling for effecting a fluid-tight union between a flared copper tube and a flexible hose or pipe. The coupling is also particularly constructed to permit the same to be easily and firmly attached to a supporting wall or frame, and to permit the flexible hose and flared tube to be connected with and supported by the opposite ends thereof on opposite sides of the wall or frame. As constructed the coupling also includes a single unitary seating member for both the flexible hose, and flared tube, which member is an independent piece or part adapted to be removed and replaced within the coupling body. This seating member may be made of different metal or material than the body, and one end thereof provides a relatively large flat abutting and sealing face for the hose or pipe, whereas the opposite end is tapered or of frustro-conical shape and reduced in diameter to permit the flared end of a small copper tube to be united in sealing engagement therewith, all as hereinafter more fully described and also concisely set forth in the claims.

Figure 1:
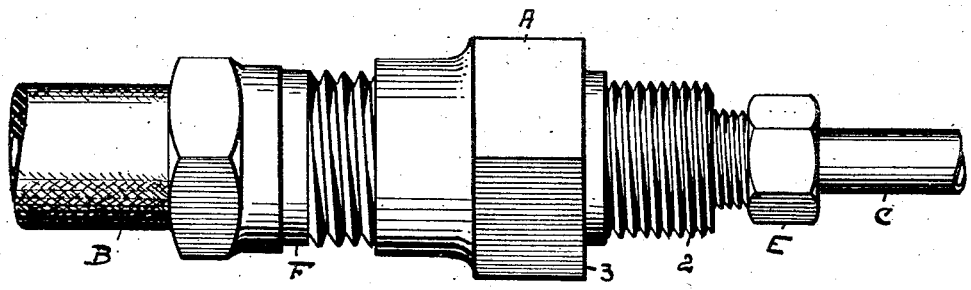
Figure 2:
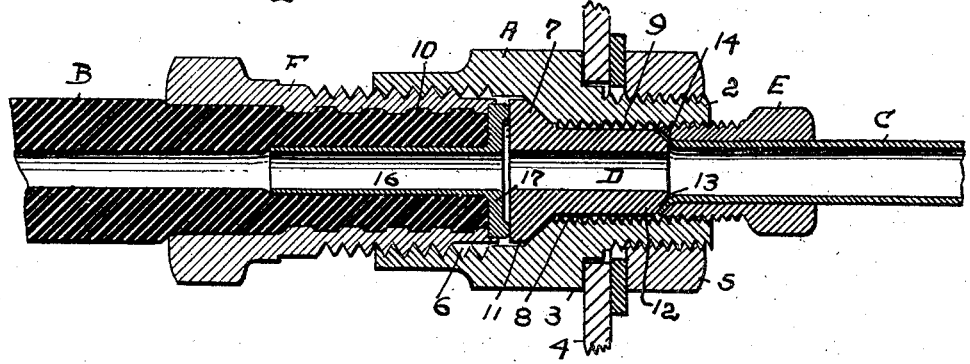
Figure 3:
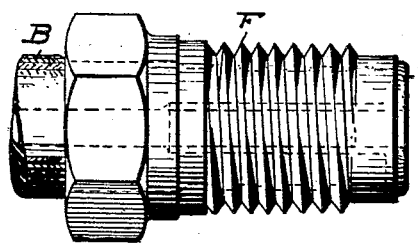
Figure 4:
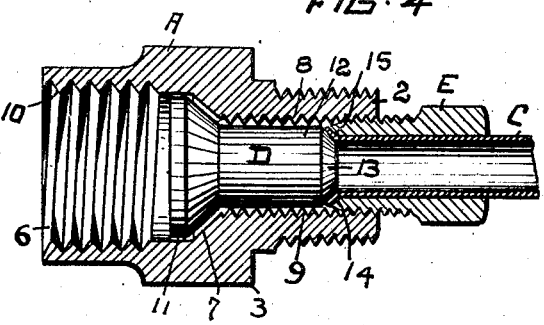

In the accompanying drawing, Fig. 1 is a side elevation of a coupling constructed according to my invention, and Fig. 2 is a sectional view longitudinally thereof, including a flexible hose and a flared copper tube. Fig. 3 is a side view of the coupling nut for the flexible hose, and Fig. 4 is a sectional view of the coupling body and the coupling nut for the flared tube, and showing the separate seating and sealing member in elevation within the body.

The coupling comprises a metal body A having a screw-threaded extension 2 of reduced diameter at one end and formed with a shouldered enlargement 3 at its middle to permit this member to be fixed rigidly to a supporting wall 4 by means of a nut 5. The larger end of body A is provided axially with a screw-threaded opening or cavity 6 having a smoothly-finished inwardly-tapering bottom or seat 7 within the zone of hexagonal enlargement 3, and the reduced extension 2 is also formed with an axial opening 8 which extends through the tapering bottom or seat 7. Internal screw-threads 9 extend the full length of the opening 8 in extension 2, and these screw-threads are of reduced pitch and size compared with the screw-threads 10 in the larger opening or cavity 6. Body A may be made of steel, brass, or any suitable metal adapted to be readily machined.

Having a coupling member or body A as described, a flexible hose B and a flared copper tube C may be coupled together with fluid-tight sealing results by inserting a single seating and sealing member D for both these parts within the larger opening 6 preliminary to introducing the hose and the tube within the opposite ends of the body. Thus, member D is a separate piece of metal, preferably brass or other non-corrodible metal, which is fashioned with a flat frusto-conical enlargement or head 11 and a reduced cylindrical shank or stem 12 is chamfered or beveled to provide a conical seat and sealing surface 13 against which the flaring flanged end 14 of copper tube C may be tightly clamped by a tubular nut E. This nut is formed with a flaring mouth 15 corresponding to the angular bevel or chamfer on the end of shank 12 of member D to permit a sealing union to be effected when member D is moved inwardly or anchored or held against axial movement outwardly within the larger recess or cavity 6 in body A.

Sealing member D is secured in a fixed position within body A when hose B is connected to the body, and for that purpose the hose is provided with a tubular connecting nut F adapted to be introduced within the larger screw-threaded cavity 6. A metal tube or nipple 16 fixed within the mouth of the hose has a disk-shaped enlargement or ribbed flange 17 seated within the inner end of nut F in abutting engagement with the end of the hose, and the ribbed flange 17 is adapted to be pressed tightly against the annular flat surface of head 11 of member B when connecting nut F is screwed home within the cavity. In so doing the conical side of head 11 may be seated tightly against the inwardly-tapering seat or bottom 7 within body A, depending upon the presence and position of the smaller nut E within the smaller screw-threaded opening 8 in body A. That is, if the flared tube C and smaller nut E are not attached or in a definitely fixed position within the extension 2 of body A, the frusto-conical head 11 of sealing member D will be clamped tightly against the tapering bottom 17 when hose B is attached to body A with its sealing nipple abutting tightly against the flat side of head 11. But should the flared tube C be first coupled to body A by nut E and introduced say more deeply into extension 2, then head 11 may not be seated against the tapering bottom 17 but be spaced apart therefrom, all without lessening the final sealing effectiveness of the device inasmuch as the larger nut F when screwed home will press the nipple tightly against head 11 and thereby force the conical end 13 of the separate sealing member D tightly against the flaring flange of tube C, thereby clamping the flange with sealing results within the flaring mouth of nut E as well as sealing the end joint between hose B and the flat head 11 of member D. Accordingly, should the hose or flared tube vary in length in any given installation, or the connecting ends of the hose and tube be spaced differently within the coupling body, a double union and seal may still be effected by the single sealing member D which is free to shift axially within the coupling body to accommodate such variations, it being further understood that body A is or may be required to be fixed to wall 4 and in a stationary position when coupling connections are being made.

What I claim, is:

1. A pipe and tube coupling, comprising a coupling body having an axial passage with enlarged and reduced entrances at opposite ends thereof, a separate seating and sealing member of cylindrical form within said passage having enlarged and reduced end seats for effecting sealing unions with a pipe and a flared tube respectively, said body and said sealing and seating member having co-acting seating faces, and means shiftably connected with said body to effect sealing engagement of said pipe and tube with said seating and sealing member, the seating face of said seating and sealing member being axially shiftable toward or away from the co-acting seating face on said body.

2. A pipe and tube coupling, comprising a coupling body having an axial opening with enlarged and reduced screw-threaded entrances at opposite ends thereof, a passaged member axially shiftable within said opening having enlarged and reduced portions extending into the bottoms of said respective entrances, said body and said insert member having co-acting seating faces, and means for clamping a pipe and a flanged tube in sealing engagement with the enlarged and reduced portions respectively, of said insert member, regardless of the relative position of said co-acting seating faces.

3. A pipe and tube coupling, comprising a coupling body having a screw-threaded cavity within one end and an axial opening of reduced diameter extending through its opposite end to said cavity, a separate insert member axially shiftable with respect to the body and having an enlarged part confined within the bottom of said cavity and a reduced part extending into said opening, co-acting seating faces on said enlarged part of said insert member and in the wall of said screw-threaded cavity, and shiftable means coupled with said body for connecting a pipe and a flanged tube in sealing and clamping abutting engagement with the aforesaid enlarged and reduced part of said insert member, regardless of the position of said member in said axial opening of the coupling body.

In testimony whereof I affix my signature.

ALBERT J. WEATHERHEAD, Jr.